(12) United States Patent
Hartmann et al.

(10) Patent No.: US 11,031,889 B2
(45) Date of Patent: Jun. 8, 2021

(54) DRIVE DEVICE AND METHOD FOR OPERATING A DRIVE DEVICE

(71) Applicant: AUDI AG, Ingolstadt (DE)

(72) Inventors: Matthias Hartmann, Kösching (DE); Stefan Maiwald, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/796,019

(22) Filed: Feb. 20, 2020

(65) Prior Publication Data
US 2020/0274468 A1   Aug. 27, 2020

(30) Foreign Application Priority Data

Feb. 21, 2019   (DE) .......................... 102019202334.7

(51) Int. Cl.
*H02P 7/34*   (2016.01)

(52) U.S. Cl.
CPC ..................... *H02P 7/34* (2013.01)

(58) Field of Classification Search
CPC .... H02P 7/34; H02P 9/00; H02P 9/006; H02P 9/007; H02P 9/008; H02P 9/04; H02P 9/06; H02P 9/08; H02P 9/10; H02P 9/48; H02P 11/00; H02P 11/04; H02P 11/06; H02P 1/00; H02P 1/04; H02P 1/026; H02P 1/16; H02P 1/163; H02P 1/18; H02P 1/24;
(Continued)

(56) References Cited

U.S. PATENT DOCUMENTS 5,635,805 A * 6/1997 Ibaraki ................. B60K 6/48
                                            318/139
6,202,776 B1 * 3/2001 Masberg ............. F02N 11/0818
                                            180/65.22
(Continued)

FOREIGN PATENT DOCUMENTS

DE   10 2009 039 684 A1   3/2011
DE      102012206932 A1   10/2013
(Continued)

OTHER PUBLICATIONS

Examination Report dated Feb. 3, 2020 in corresponding German application No. 102019202334.7; 30 pages including Machine-generated English-language translation.
(Continued)

*Primary Examiner* — Antony M Paul
(74) *Attorney, Agent, or Firm* — Maier & Maier, PLLC

(57) ABSTRACT

A drive device, having a first electric machine operable as a generator and a second electric machine operable as a motor, which are electrically connected to one another, so that the second electric machine is operable using electric energy provided by the first electric machine, wherein an energy accumulator for temporarily storing electric energy is electrically connected to the first electric machine and the second electric machine. It is provided in this case that the first electric machine and the second electric machine are electrically directly connected to one another via an intermediate circuit, wherein the energy accumulator is electrically connected to the intermediate circuit via a switch arrangement both directly and also indirectly via a voltage converter. The disclosure furthermore relates to a method for operating a drive device.

10 Claims, 1 Drawing Sheet

(58) Field of Classification Search
CPC ...... H02P 1/26; H02P 1/42; H02P 1/46; H02P 1/465; H02P 1/50; H02P 1/54; H02P 3/00; H02P 3/18; H02P 3/24; H02P 3/26; H02P 4/00; H02P 5/00; H02P 5/60; H02P 5/68; H02P 5/69; H02P 5/695; H02P 6/00; H02P 6/05; H02P 6/04; H02P 6/14; H02P 7/32; H02P 27/00; H02P 27/04; H02P 27/06; H02P 21/00
See application file for complete search history.

(56) References Cited

U.S. PATENT DOCUMENTS

| | | | |
|---|---|---|---|
| 6,487,998 B1 * | 12/2002 | Masberg | F02D 41/1497 123/192.1 |
| 9,371,139 B2 | 6/2016 | Luecken et al. | |
| 9,499,159 B2 * | 11/2016 | Gotoh | B60W 20/11 |
| 9,981,666 B2 * | 5/2018 | Ono | B60W 10/182 |
| 2006/0001410 A1 | 1/2006 | Ishikawa et al. | |
| 2006/0145482 A1 * | 7/2006 | Roethler | B60K 6/12 290/400 |
| 2008/0223250 A1 | 9/2008 | Bachman | |
| 2010/0231190 A1 | 9/2010 | Falvey et al. | |
| 2011/0011658 A1 | 1/2011 | Takizawa | |
| 2011/0285375 A1 | 11/2011 | DeBoy | |

FOREIGN PATENT DOCUMENTS

| | | |
|---|---|---|
| DE | 102014011768 A1 | 2/2015 |
| DE | 102014208192 A1 | 11/2015 |
| DE | 102014208201 A1 | 11/2015 |
| EP | 0972668 A2 | 1/2000 |
| EP | 1 894 767 A1 | 3/2008 |
| EP | 2 206 229 A1 | 7/2010 |
| EP | 2 621 068 A1 | 7/2013 |
| EP | 2 670 016 A2 | 12/2013 |
| EP | 3 351 472 A2 | 7/2018 |
| WO | 2005/036297 A1 | 4/2005 |
| WO | 2005/085630 A1 | 9/2005 |
| WO | 2015/079238 A1 | 6/2015 |
| WO | 2018/106530 A1 | 6/2018 |
| WO | 2019/040037 A1 | 2/2019 |

OTHER PUBLICATIONS

The extended European Search Report dated May 20, 2020, including the European Search Report and the European Search Opinion, in connection with corresponding EP Application No. 20157089.2 (16 pgs., including machine-generated English translation).

Wikipedia web page, "Diesel locomotive", author unknown, dated Dec. 8, 2018, downloaded on Jun. 8, 2020, at URL: https://en.wikipedia.org/w/index.php?title-Diesel_locomotive&oldid=872621386#Diesel-electric, (26 pgs.).

European Examination Report dated Mar. 30, 2021, in connection with corresponding EP Application No. 20 157 389.2 (17 pp., including machine-generated English translation).

* cited by examiner

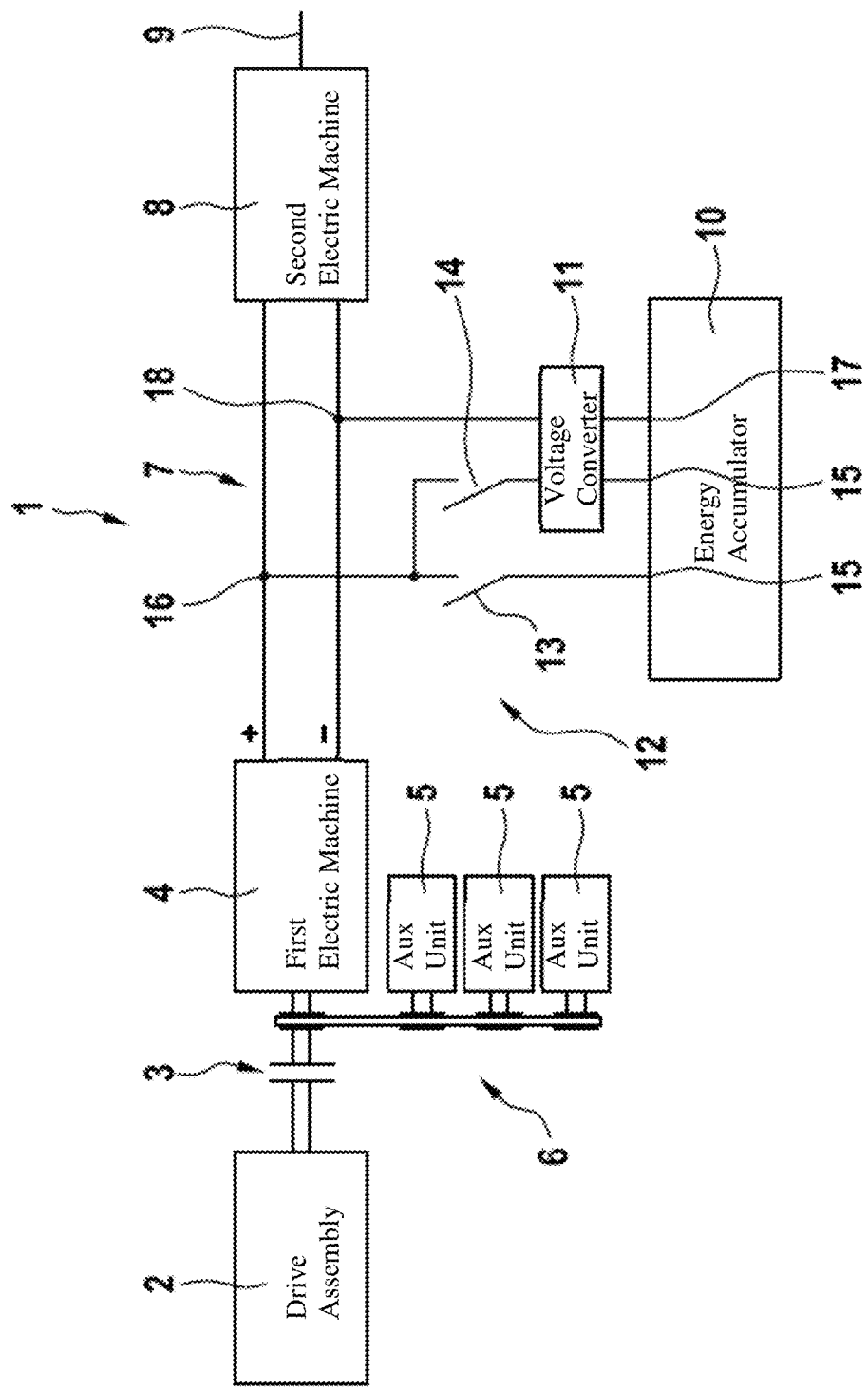

DRIVE DEVICE AND METHOD FOR OPERATING A DRIVE DEVICE

FIELD

The disclosure relates to a drive device, having a first electric machine operable as a generator and a second electric machine operable as a motor, which are electrically connected to one another, so that the second electric machine is operable using electric energy provided by the first electric machine, wherein an energy accumulator for temporarily storing electric energy is electrically connected to the first electric machine and the second electric machine. The disclosure furthermore relates to a method for operating a drive device.

BACKGROUND

For example, the document WO 2015/079238 A2 is known from the prior art. It describes a hybrid vehicle having a battery for operating means for driving a vehicle, a motor/generator having a motor/generator shaft, and an internal combustion engine having an output shaft. The output shaft is connected to the motor/generator shaft via a freewheel clutch. The freewheel clutch is arranged in such a way that it permits the motor/generator to rotate faster than the output shaft, but prevents faster rotation of the output shaft than the motor/generator shaft. The hybrid vehicle comprises one or more auxiliary units, which are directly connected to the motor/generator shaft, so that the one auxiliary unit or the multiple auxiliary units are driven when the motor/generator shaft rotates.

SUMMARY

It is the object of the disclosure to propose a drive device which has advantages over known drive devices, in particular ensures a high level of flexibility and a high level of efficiency of the drive device.

This is achieved according to the disclosure by a drive device having the features of claim 1. It is provided in this case that the first electric machine and the second electric machine are directly electrically connected to one another via an intermediate circuit, wherein the energy accumulator is electrically connected via a switch arrangement to the intermediate circuit both directly and also indirectly via a voltage converter The drive device is used, for example, for driving a motor vehicle, in this regard thus for providing a drive torque directed toward the driving of the motor vehicle. The drive device is thus provided and designed for a motor vehicle or forms a component of the motor vehicle. The disclosure is obviously also accordingly directed to a motor vehicle having the described drive device.

To provide the drive torque, the drive device comprises the first electric machine and the second electric machine. The first electric machine is provided and designed as a generator or is at least operable as a generator. The second electric machine, in contrast, is provided and designed as a motor or is at least operable as a motor. The first electric machine is preferably drivable by means of a drive assembly, wherein the drive assembly is provided, for example, in the form of an internal combustion engine. Due to the driving of the first electric machine, it provides electric energy, which is used at least sometimes for operating the second electric machine. The drive torque of the drive device is thus provided by the second electric machine.

For example, the drive device has an output shaft. The second electric machine is coupled to the output shaft, preferably rigidly and/or permanently. In contrast, the first electric machine is decoupled from the output shaft with respect to drive and/or mechanically. This means that only the second electric machine, but not the first electric machine, provides the drive torque of the drive device, namely at the output shaft. The drive device is thus provided as a serial drive device or as a serial hybrid drive device, respectively.

The output shaft can be connected with respect to drive directly or only indirectly via a transmission, in particular a shift gear transmission, to at least one wheel axle of the motor vehicle. At least one driven wheel of the motor vehicle is provided at the wheel axle, which wheel is connected with respect to drive to the second electric machine and/or the output shaft. The second electric machine and/or the output shaft is preferably directly operationally connected to the wheel axle and/or to the at least one wheel of the wheel axle, specifically preferably rigidly and/or permanently.

However, it can also be provided that the transmission, preferably the shift gear transmission, is provided with respect to drive between the second electric machine and/or the output shaft, on the one hand, and the wheel axle and/or the at least one wheel of the wheel axle. With the aid of the transmission, a transmission ratio is implemented between the second electric machine and/or the second electric machine and/or the output shaft and the wheel axle and/or its wheel. The shift gear transmission additionally permits a change of the transmission ratio, thus in this regard the setting of one transmission ratio selected from multiple possible transmission ratios.

The first electric machine and the second electric machine are electrically connected to one another via the intermediate circuit. In this case, they are directly connected to one another via the intermediate circuit, so that the first electric machine is thus electrically connected directly to the second electric machine. This means that the first electric machine and the second electric machine are connected to one another via a continuous electric connection, namely the intermediate circuit.

There are thus no electric or electronic components located between the first electric machine and the second electric machine. In particular, a voltage converter, an energy accumulator, or the like is not provided between the two electric machines. It is thus not provided, as in other possible designs of the drive device, that the two electric machines are electrically connected to one another via a voltage converter or an energy accumulator. Rather, the direct and immediate connection between them is established via the intermediate circuit.

However, a disconnecting device and/or a measuring device, which can comprise electric and/or electronic components, is located between the first electric machine and the second electric machine. The disconnecting device is used to interrupt the electric connection between the first electric machine and the second electric machine. It is provided, for example, in the form of a fuse, a contactor, or the like. The measuring device is used, for example, for measuring a voltage and/or an amperage of the electric current flowing between the two electric machines.

To enable a flexible operation of the drive device, the energy accumulator is electrically connected to the intermediate circuit. The energy accumulator is used for temporarily storing electric energy and enables an operation of the second electric machine even if the first electric machine is stationary or provides less electric energy than is required for operating the second electric machine. The energy accumulator is thus connected both directly and also indirectly via the voltage converter to the intermediate circuit, but in any case via the switch arrangement.

With the aid of the switch arrangement, it can be selected whether the electric connection between the energy accumulator and the intermediate circuit is provided directly and immediately or is to be established via the voltage converter. For example, the energy accumulator is thus electrically connected to the intermediate circuit directly, but not via the voltage converter, in a first switch setting of the switch arrangement. In a second switch setting, in contrast, the energy accumulator is electrically connected to the intermediate circuit via the voltage converter, but not directly. Accordingly, with the aid of the switch arrangement, either a battery voltage of the energy accumulator can be applied directly to the intermediate circuit or alternatively a converter voltage, which is provided by the voltage converter, different from the battery voltage can be applied.

Using such a design of the drive device, on the one hand, an extremely high efficiency can be achieved, because a suitable voltage can always be applied to the intermediate circuit with the aid of the voltage converter. On the other hand, unnecessary conversion losses are avoided at least sometimes, because the energy accumulator is electrically connectable directly to the intermediate circuit while bypassing the voltage converter. Furthermore, an extremely high degree of freedom with respect to the design of the energy accumulator results due to the described design of the drive device, for example, with respect to the number of battery cells installed in the energy accumulator and the interconnection thereof.

The two electric machines can also be designed for defined voltages, so that a cost and weight advantage results. Finally, it is possible with the aid of the described design of the drive device to charge the energy accumulator at arbitrary charging stations, independently of the voltage which is provided by them. This is because an adaptation of the charging voltage to the battery voltage or vice versa can be performed with the aid of the voltage converter.

A further embodiment of the disclosure provides that a drive unit is connected with respect to the drive to the first electric machine and also at least one auxiliary unit permanently coupled to the first electric machine. The drive unit is preferably provided in the form of an internal combustion engine. The first electric machine is drivable with the aid of the drive unit. For this purpose, the drive unit is coupled or at least can be coupled with respect to drive to the first electric machine. For example, the drive unit is thus directly connected with respect to drive to the first electric machine or alternatively only indirectly via a disconnecting clutch. With the aid of the disconnecting clutch, the drive unit can alternately be coupled to the first electric machine or decoupled therefrom.

Furthermore, the drive device has the at least one auxiliary unit. The auxiliary unit can be provided, for example, in the form of a further electric machine, a climate control compressor, a fluid pump, in particular a hydraulic pump, or the like. The auxiliary unit is permanently coupled with respect to drive to the first electric machine, so that it is always driven if the first electric machine is operated and/or is driven. The auxiliary unit is preferably always driven when the first electric machine is driven with the aid of the drive unit. In this case, the driving of the auxiliary unit is performed with the aid of the drive unit.

However, if the above-described disconnecting clutch is provided, it is thus preferably provided that the auxiliary unit can also be driven when the disconnecting clutch is open, i.e., when first electric machine is decoupled from the drive unit, namely by operating the first electric machine as a motor, preferably using electric energy temporarily stored in the energy accumulator. Particularly flexible operation of the drive device results in this way.

A further preferred design of the disclosure provides that the first electric machine and the at least one auxiliary unit are connected with respect to drive to the drive unit via a disconnecting clutch. This was already mentioned above. The disconnecting clutch is arranged with respect to drive between the first electric machine and the at least one auxiliary unit, on the one hand, and the drive unit, on the other hand. When the disconnecting clutch is closed, the first electric machine and the auxiliary unit are thus connected with respect to drive to the drive unit. When the disconnecting clutch is open, in contrast, they are decoupled with respect to drive from the drive unit.

Independently of the switch position of the disconnecting clutch, however, the first electric machine and the at least one auxiliary unit are connected to one another with respect to drive, i.e., rigidly and permanently. The drive connection between the first electric machine and the auxiliary unit can be arbitrarily established in principle. For example, it is provided via a traction mechanism drive, for example, a friction-locked traction mechanism drive or a formfitting traction mechanism drive. Alternatively, a gear wheel drive or the like can also be provided. The described design of the drive device enables a flexible and efficient operation of the at least one auxiliary unit.

One refinement of the disclosure provides that a first pole of the energy accumulator is electrically connected to a first pole of the intermediate circuit directly in a first switch position of the switch arrangement and indirectly via the voltage converter in a second switch position of the switch arrangement. The first pole of the energy accumulator and the first pole of the intermediate circuit each describe a first voltage level. For example, the first poles are provided as positive poles. A design as negative poles can also be provided, however.

In any case, however, it is provided that the first pole of the energy accumulator is electrically connected to the first pole of the intermediate circuit directly and while bypassing the voltage converter in the first switch position. In the second switch position, in contrast, it is only indirectly connected via the voltage converter, i.e., not directly, to the first pole of the intermediate circuit. In this way, the energy accumulator can be connected either directly or via the voltage converter to the intermediate circuit, whereby the above-explained advantages are achieved.

One preferred further design of the disclosure provides that the switch arrangement comprises a first switch and a second switch, wherein the first pole of the energy accumulator is electrically connected to the intermediate circuit directly via the first switch and indirectly via the second switch via the voltage converter. The connection of the energy accumulator to the intermediate circuit either directly or via the voltage converter is thus performed by corresponding setting of the two switches.

Preferably, only one of the two switches is always closed and the respective other of the switches is open. With the aid of the switch arrangement, the energy accumulator is thus prevented from being electrically connected both directly and also via the voltage converter to the intermediate circuit. The first switch is electrically arranged between the first pole of the energy accumulator and the intermediate circuit and/or its first pole. The second switch, in contrast, is electrically arranged between the voltage converter and the intermediate circuit. A particularly flexible operation of the drive device is achieved in this way.

Finally, it can be provided in the scope of a further design of the disclosure that a second pole of the energy accumulator is permanently electrically connected to a second pole of the intermediate circuit via the voltage converter. The second poles each have a voltage level which is different from that of the first poles. For example, the second poles are designed as electric ground or as negative poles, respectively, or as positive poles. If the first poles are provided as positive poles, the second poles are thus preferably negative poles and vice versa. In any case, the electric connection between the second poles runs via the voltage converter. They are preferably directly connected to one another via this, however, so that the electric connection between the two poles is only looped through in the voltage converter. This means that there are also no electric components or electronic components in the voltage converter between the two second poles. The above-described high efficiency is achieved in this way.

The disclosure furthermore relates to a method for operating a drive device, in particular a drive device according to the statements in the scope of this description, wherein the drive device has a first electric machine operable as a generator and a second electric machine operable as a motor, which are electrically connected to one another, so that the second electrical machine is operable using electric energy provided by the first electric machine, wherein an energy accumulator for temporarily storing electric energy is electrically connected to the first electric machine and the second electric machine.

It is provided in this case that the first electric machine and the second electric machine are electrically directly connected to one another via an intermediate circuit, wherein the energy accumulator is electrically connected to the intermediate circuit via a switch arrangement both directly and also indirectly via a voltage converter and one switch setting is selected from multiple switch settings for the switch arrangement and is set on the switch arrangement.

The advantages of such a design of the drive device and/or such a procedure were already indicated. Both the drive device and also the method for its operation can be refined according to the statements in the scope of this description, so that reference is made thereto in this regard.

One refinement of the disclosure provides that in the case of an intermediate circuit voltage in the intermediate circuit which is less than or equal to a target voltage, the switch setting is selected in such a way that the energy accumulator is electrically connected directly to the intermediate circuit. In this switch setting, the voltage in the intermediate circuit is assisted by the battery voltage of the energy accumulator. A particularly high efficiency is achieved because of the bypassing of the voltage converter. The target voltage can also be referred to as a reference voltage. It is defined once, for example, and is thus constant.

A further preferred embodiment of the disclosure provides that in the case of an intermediate circuit voltage in the intermediate circuit which is greater than the target voltage, the switch setting is selected in such a way that the energy accumulator is electrically connected to the intermediate circuit via the voltage converter. The battery voltage is thus stepped down via the voltage converter, in particular to the target voltage. In this way, an adaptation of the voltage in the intermediate circuit, i.e., the intermediate circuit voltage, is achieved in a particularly effective manner.

Finally, it can be provided in the scope of a further design of the disclosure that the target voltage is determined on the basis of at least one of the following variables: an operating point of the drive device, an operating point of the first electric machine, an operating point of the second electric machine, an amperage of an electric current flowing through the intermediate circuit, and an amperage and/or a voltage of an electric current used for charging the energy accumulator. For example, the target voltage is determined from one or more of the operating points with the aid of an efficiency map. In this case, the target voltage is selected in such a way that the efficiency of the drive device is optimal as a whole. At least one of the operating points, preferably multiple or all of the operating points, are used as input variables for the efficiency map.

Additionally or alternatively, an operating point of the voltage converter, a state variable of the energy accumulator, and/or a state variable of the switch arrangement can be used as an input variable. Additionally or alternatively, the amperage of the electric current in the intermediate circuit can be taken into consideration in the ascertainment of the target voltage. This additionally or alternatively applies to the voltage of the electric current used for charging the energy accumulator, which can also be referred to as a charging voltage. An operating point is to be understood in principle, for example, as a voltage and/or an amperage of an electric current.

BRIEF DESCRIPTION OF THE DRAWINGS

The disclosure is explained in greater detail hereafter on the basis of the exemplary embodiments illustrated in the drawing, without a restriction of the disclosure occurring. In this case, the single FIG. 1. shows a schematic illustration of a drive device, in particular for a motor vehicle.

DETAILED DESCRIPTION

The FIGURE shows a schematic illustration of a drive device 1, as is used in particular for a motor vehicle. The drive device 1 has a drive assembly 2, for example, an internal combustion engine, which is connected with respect to drive to a first electric machine 4 via a disconnecting clutch 3. The first electric machine 4 is operable in particular as a generator. The drive device 1 also has at least one auxiliary unit 5, in the exemplary embodiment shown here multiple auxiliary units 5. These units are each coupled with respect to drive to the first electric machine 4, preferably permanently. For example, the coupling of the at least one auxiliary unit 5 to the first electric machine 4 is performed via a traction mechanism drive 6. If multiple auxiliary units 5 are provided, they are thus preferably coupled via a common traction mechanism drive 6 to the first electric machine 4.

The first electric machine 4 is electrically connected to a second electric machine 8 via an intermediate circuit 7. The second electric machine 8 is used for providing a drive torque of the drive device 1, in particular at a driveshaft 9. Each of the electric machines 4 and 8 has—if necessary—a control unit, which comprises, for example, a power electronics unit and/or an inverter. Such a control unit can be omitted if the electric machines 4 and 8 are designed as direct-current machines. However, they are preferably provided as alternating current or three-phase current machines, so that the control unit is provided in each case.

The drive device 1 additionally has an energy accumulator, which is provided and designed for temporarily storing electric energy. The energy accumulator 10 is electrically connected to the intermediate circuit 7 both directly and also only indirectly via a voltage converter 11, specifically via a switch arrangement 12. The switch arrangement 12 comprises a first switch 13 and a second switch 14. The energy accumulator 10 is directly electrically connected to the intermediate circuit 7 via the first switch 13, and indirectly via the voltage converter via the second switch 14.

A first pole 15 of the energy accumulator 10 is electrically connected or electrically connectable to a first pole 16 of the intermediate circuit 7 via the first switch 13 for this purpose. In the exemplary embodiment shown here, the first poles 15 for the two switches 13 and 14 are shown separately from one another. However, they are preferably identical. However, it can also be provided that the first poles 15 of the energy accumulator 10 have different voltage levels, so that different voltages of the energy accumulator 10 can thus be tapped at the first poles 15.

A second pole 17 of the energy accumulator 10 is electrically connected via the voltage converter 11 to a second pole 18 of the intermediate circuit 7, i.e., for example, not via the switch arrangement 12. The voltage converter 11 is preferably designed in such a way that the two second poles 17 and 18 inside the voltage converter 11 are directly electrically connected to one another, so that no electric or electronic components are thus provided between the second poles 17 and 18 in spite of the looping through the voltage converter 11.

The described design of the drive device 1 enables particularly efficient operation of the drive device 1 and moreover a high level of flexibility in the design of the electric machines 4 and 8 and of the energy accumulator 10.

The invention claimed is:

1. A drive device, comprising:
a first electric machine operable as a generator and a second electric machine operable as a motor, which are electrically connected to one another, so that the second electric machine is operable using electric energy provided by the first electric machine, wherein an energy accumulator for temporarily storing electric energy is electrically connected to the first electric machine and the second electric machine, wherein the first electric machine and the second electric machine are electrically directly connected to one another via an intermediate circuit, wherein the energy accumulator is electrically connected to the intermediate circuit via a switch arrangement both directly and indirectly via a voltage converter.

2. The drive device according to claim 1, wherein a drive unit is connected with respect to drive to the first electric machine and also at least one auxiliary unit is permanently coupled to the first electric machine.

3. The drive device according to claim 1, wherein the first electric machine and the at least one auxiliary unit are connected with respect to drive to the drive unit via a disconnecting clutch.

4. The drive device according to claim 1, wherein a first pole of the energy accumulator is electrically connected to a first pole of the intermediate circuit directly in the case of a first switch setting of the switch arrangement and indirectly via the voltage converter in the case of a second switch setting of the switch arrangement.

5. The drive device according to claim 1, wherein the switch arrangement comprises a first switch and a second switch, wherein the first pole of the energy accumulator is electrically connected to the intermediate circuit directly via the first switch and indirectly via the voltage converter via the second switch.

6. The drive device according to claim 1, wherein a second pole of the energy accumulator is electrically connected to a second pole of the intermediate circuit permanently via the voltage converter.

7. A method for operating a drive device, wherein the drive device has a first electric machine operable as a generator and a second electric machine operable as a motor, which are electrically connected to one another, so that the second electric machine is operable using electric energy provided by the first electric machine, wherein an energy accumulator for temporarily storing electric energy is electrically connected to the first electric machine and the second electric machine, wherein the first electric machine and the second electric machine are electrically directly connected to one another via an intermediate circuit, wherein the energy accumulator is electrically connected to the intermediate circuit via a switch arrangement both directly and indirectly via a voltage converter and one switch setting is selected for the switch arrangement from multiple switch settings and set on the switch arrangement.

8. The method according to claim 7, wherein, in the case of an intermediate circuit voltage in the intermediate circuit which is less than or equal to a target voltage, the switch setting is selected in such a way that the energy accumulator is electrically connected directly to the intermediate circuit.

9. The method according to claim 7, wherein, in the case of an intermediate circuit voltage in the intermediate circuit which is greater than the target voltage, the switch setting is selected in such a way that the energy accumulator is electrically connected to the intermediate circuit via the voltage converter.

10. The method according to claim 7, wherein the target voltage is determined on the basis of at least one of the following variables: an operating point of the drive device, an operating point of the first electric machine, an operating point of the second electric machine, an amperage of an electric current flowing through the intermediate circuit, and an amperage and/or a voltage of an electric current used for charging the energy accumulator.

* * * * *